(12) United States Patent
Krause

(10) Patent No.: US 12,271,964 B1
(45) Date of Patent: Apr. 8, 2025

(54) PROJECT ASSEMBLY SYSTEM

(71) Applicant: Richard A. Krause, Arlington Heights, IL (US)

(72) Inventor: Richard A. Krause, Arlington Heights, IL (US)

( * ) Notice: Subject to any disclaimer, the term of this patent is extended or adjusted under 35 U.S.C. 154(b) by 355 days.

(21) Appl. No.: 17/534,023

(22) Filed: Nov. 23, 2021

Related U.S. Application Data

(63) Continuation-in-part of application No. 17/517,191, filed on Nov. 2, 2021, and a continuation-in-part of application No. 17/508,277, filed on Oct. 22, 2021, now Pat. No. 12,118,631, and a continuation-in-part of application No. 17/492,246, filed on Oct. 1, 2021, and a continuation-in-part of application No. 17/133,714, filed on Dec. 24, 2020, now Pat. No. 11,321,791.

(60) Provisional application No. 63/117,043, filed on Nov. 23, 2020.

(51) Int. Cl.
 *G06Q 50/08* (2012.01)
 *G06Q 10/0631* (2023.01)

(52) U.S. Cl.
 CPC ....... *G06Q 50/08* (2013.01); *G06Q 10/06313* (2013.01); *G06Q 10/06316* (2013.01)

(58) Field of Classification Search
 CPC ............. G06Q 50/08; G06Q 10/06313; G06Q 10/06316; G06Q 10/087

USPC .......................................................... 705/28
 See application file for complete search history.

(56) References Cited

U.S. PATENT DOCUMENTS

| | | | |
|---|---|---|---|
| 2006/0015475 A1* | 1/2006 | Birkner | G06Q 50/08 |
| 2018/0012125 A1* | 1/2018 | Ladha | G01S 17/89 |

FOREIGN PATENT DOCUMENTS

| | | | |
|---|---|---|---|
| CN | 111723217 A | * | 9/2020 |

\* cited by examiner

*Primary Examiner* — Ariel J Yu
*Assistant Examiner* — Denisse Y Ortiz Roman
(74) *Attorney, Agent, or Firm* — Christopher J. Scott

(57) ABSTRACT

A project assembly system carries out the entire assembly of a designed construction project by directing subjects that will do the actual assembly, including utilizing automation and robotics that are currently available, and is adaptable to automation and robotics as the system evolves into the future. Initially, this system/module gathers the project design data, existing conditions of the site, and basic schedule constraint goal information inputted into it. It then takes this information, separates and categorizes all parts and pieces from large pieces of equipment and assembly systems to the smallest connection materials such as closure trim, screws, nails, adhesives, etc. With this information, the system further establishes project control points to ensure precise placement of each element and creates a step-by-step, piece by piece, matrix and sequence to control and direct the placement of each element.

20 Claims, 1 Drawing Sheet

AutoBuild Project Assembly & Quality Verification

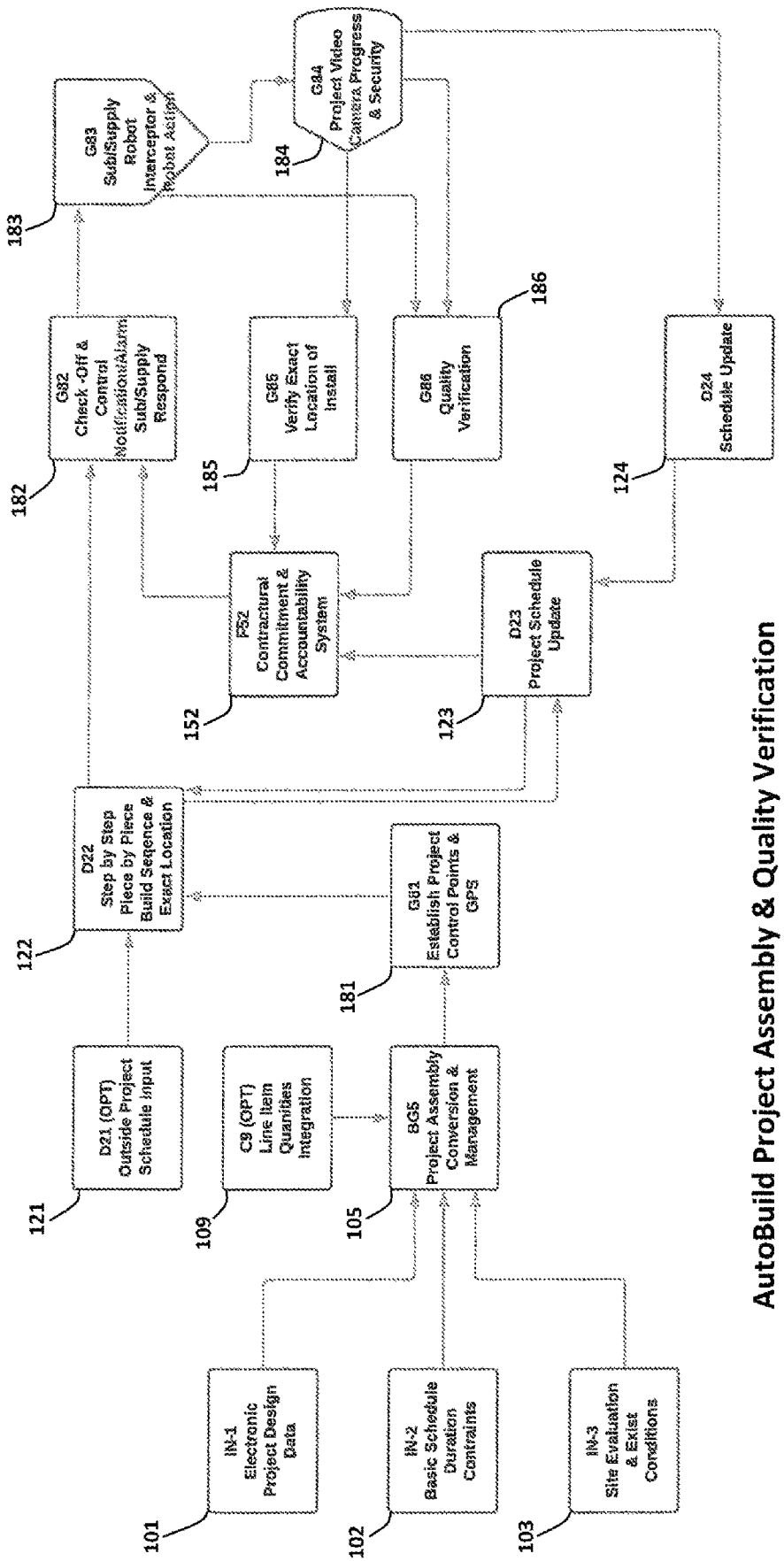

PROJECT ASSEMBLY SYSTEM

PRIOR HISTORY

This application claims the benefit of U.S. Provisional Patent Application No. 63/117,043 filed in the United States Patent and Trademark Office (USPTO) on 23 Nov. 2020; is a Continuation-in-Part application of U.S. patent application Ser. No. 17/133,714 filed in the USPTO on 24 Dec. 2020; is a Continuation-in-Part application of U.S. patent application Ser. No. 17/492,246 filed in the USPTO on 1 Oct. 2021; is a Continuation-in-Part application of U.S. patent application Ser. No. 17/508,277 filed in the USPTO on 22 Oct. 2021; and is a Continuation-in-Part application of U.S. patent application Ser. No. 17/517,191 filed in the USPTO on 2 Nov. 2021, the specifications and drawings of which applications are hereby incorporated by reference thereto.

FIELD OF THE INVENTION

These specifications generally relate to a system for managing a construction project, and more particularly to a system that automates the fabrication, delivery, and erection/assembly required to complete a construction project.

BRIEF DESCRIPTION OF THE PRIOR ART

US Patent Application Publication No. 2020/0151937, authored by Miller (937 Publication), discloses a Method and System for Construction Project Management Using Photo Imaging Measurements. The '937 Publication describes harnesses the use of photo imaging and measurement capture for use by do-it-yourselfers, handymen and small contractors. The method and system operates on mobile computing devices and includes an image recognition system. By performing various imaging-based measurements and then processing the resultant data, the method and system produces bills of materials, invoices, and receipts for the necessary tools and materials required by the construction project.

US Patent Application Publication No. 2020/0027043, authored by Agassi, et al. ('043 Publication), discloses a Construction Project Management System and Method Thereof. The '043 Publication describes a management system including processing circuitry and a memory, the memory containing instructions that, when executed by the processing circuitry, configure the system to: analyze a project data of a construction; based on the analysis of the project data, derive metadata associated with the construction project, wherein the metadata designates at least various stages associated with the construction project, and a completion threshold for each stage; and based on the metadata, generate an interface for allowing at least two end-user devices to collaboratively interact with the interface, wherein the interface provides interactive visual features indicative of a progress of each of the stages associated with the construction project.

US Patent Application Publication No. 2019/0003153, authored by Shike, et al. ('153 Publication), discloses a Construction Management System, Construction Management Method, and Management Device. The '153 Publication describes a management system including an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

US Patent Application Publication No. 2019/0026843, authored by Kim ('843 Publication), discloses a Method for Integrated Management Including Building Construction and Maintenance Based on Video. The '843 Publication describes a video-based integrated building construction and maintenance management method in which a series of processes of building construction and maintenance after build completion is produced as a video and registered in a building management server. The video is configured to be checked by a building owner or resident so that a building can be transparently managed by fundamentally preventing faulty construction that may occur during a construction step and untrustworthy maintenance.

US Patent Application Publication No. 2018/0332102, authored by Sheidaei ('102 Publication), discloses a Cloud-Based System for Collaborating Engineering, Operations, Maintenance, Project Management, Procurement, and Vendor Data and Activities. The '102 Publication describes certain systems and methods operable via a cloud platform utilizing Artificial Intelligence (AI). The system is configured to connect with a computerized application to store and manage data and activities of one or more departments.

The system enables vendors to access the data of one more departments to perform vendor activities such as generating quote documents. The system is further configured to provide a bid evaluation including a list of one or more vendor comprising products matching the requirements of the one or more departments. The system further enables personnel of one or more departments to select at least one vendor for placing orders and enables the selected vendor to submit data required by the personnel of one or more departments to collaborate data or for procurement.

US Patent Application Publication No. 2018/032225, authored by Schwartz ('225 Publication), discloses a System for On-Site Tracking, Managing, Planning and Staging Construction Projects. The '225 Publication describes a construction management system for allowing a user to capture an item identifier from an item (e.g., shipment, group of components, and/or one or more components) using a mobile device. The item identifier may be used to identify a project and access a model for the product, identify a component in a model, and/or identify the components in a shipment for staging purposes.

Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

US Patent Application Publication No. 2018/0209156, authored by Pettersson ('156 Publication), discloses a Construction Management System and Method. The '156 Publication describes a construction management system for constructing a building including at least one heavy lifting machine for moving a one building element to a mounting position on the building, a central computing unit providing a building information model comprising at least a construction plan comprising a target state of the building construction, a three-dimensional model of an actual construction state of the building, and a three-dimensional model of the element, wherein the central computing unit is adapted to determine the mounting position for the element based on the construction plan, the model of the current construction state and on the model of the element.

US Patent Application Publication No. 2018/0174250, authored by Faulkner ('250 Publication), discloses certain Construction Project Management Systems and Methods. The '250 Publication describes an operation including the steps of generating a project profile for a construction project, determining project details of the project, determining a regulatory process to be performed during the project based on the project details and regulatory rules, determining worker's certificates or licenses corresponding to the regulatory process and the project details, determining candidate workers for the construction project from registered workers, and causing a first GUI for selection of one or more candidate workers to be generated. The first GUI includes indicators of statuses of the worker's certificates or licenses corresponding to the regulatory process with respect to each of the one or more candidate workers.

US Patent Application Publication No. 2017/0278037, authored by Pettersson ('037 Publication), describes a Construction Management System and Method for Linking Data to a Building Information Model. The '037 Publication describes a construction management system comprising a plurality of sensor means adapted to detect events at a building site of the structure, a central computing unit providing a three-dimensional model of the building site, and at least one displaying device that is adapted to display the three-dimensional model to a user. The sensor means are adapted to generate data comprising information about a detected event.

The system further comprises communication units adapted to transmit a message comprising the data and a location information to the central computing unit, assign coordinates in the three-dimensional model according to the location information, evaluate options for reacting on the event by analyzing the data, assign evaluated options to the data, and display a note which is related to evaluated options to the user in real-time at the assigned coordinates in the three-dimensional model.

U.S. Pat. No. 10,831,944 ('944 Patent), issued to Giattina, discloses a System and Method to Facilitate the Design, Manufacturing and Construction of Structures. The '944 Patent describes a system that facilitates the building of a structure according to a project architectural design plan. The system provides standardized information to participants associated with a project based on the project design plan. The project architectural design plan can be compliant with one or more standards stored by the system. The project design plan can also incorporate information regarding products that are utilized in the project such as a plurality of prefabricated building modules. The requirements for a product are dictated by the standards established for the product and the project. Information about products used in the project can be embedded in links of the project architectural design plan.

U.S. Pat. No. 10,593,104 ('104 Patent), issued to Robert, et al., discloses certain Systems and Methods for Generating Time Discreet 3D Scenes. The '104 Patent describes certain methods, systems, and apparatus including medium-encoded computer program products for generating and visualizing 3D scenes of a build-site. The invention may be said to include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data. The methodology further reconstructs and outputs a series of three dimensional (3D) modeled scenes of the physical site from the site data using the imaging data, the coordinate data, and the time metadata Generally considering the state of the art exemplified by the patent publications briefly described above, the reader will bear in mind certain shortcomings in the construction industry at least insofar as its relatively low-level digitalization is concerned. In other words, the reader will note from a consideration of the foregoing that the state of construction industry art perceives a need for a digitalized comprehensive construction project management system that receives design component data from an outside design provider, converts the design component data into a standardized format for use by a plurality of interconnected system-supportive, software-based module components to advance the initial design component data from design concept to final build all within a system of full or near-full automation. What follows is a summary of a non-transitory, computer-implementable software-based application or module component supportive of a comprehensive construction project management system otherwise described more fully in U.S. patent application Ser. No. 17/133,714 ('714 Application), from which this application claims a benefit and builds thereupon.

System Background and Summary

In the world's pursuit to automate construction there is a perceived need to develop a more comprehensive and interactive matrix and communication system that can carry out all required activities of assembling a construction project. The prior art perceives a need for a system that understands all elements needed for the project and provides reliable guidance to be followed by all those elements and services that make up the project.

A project assembly system is needed that can take information provided from electronic design documents along with basic schedule constraint information and transform it all into an organized plan and sequence that is communicated to all the parts and pieces required of a project. This system operates as the true leader with the master intelligence of managing the assembly such that each individual piece is directed as to when and where it will be fabricated, delivered, and placed as well as how it connects with the other elements. The system should also contain a master three-dimensional system like GPS to ensure all elements are placed exactly where they are supposed to be placed. Additionally, this system, to work optimally, should have the capability to track and measure the quality of the elements going into the project and ensure that the elements are exactly those that have been specified.

This includes things like the proper manufacturer, color, dimensions, functions, moisture content, fastening, densities, alignments, etc. There is an abundant amount of technology and software systems in the market that assists PART of the construction process, however, none that are nearly as comprehensive as the AUTOBUILD Project Assembly System and Method, and that are made to universally cooperate with other assisting construction software in the market that allows it to expand its abilities and to construct a complete sophisticated project. This system is fully comprehensive and reliable from the very first activity on site to the final attachments and details that complete the project for its intended use.

The working parts of the AUTOBUILD Project Assembly System, in concert with related elements within these specifications together cooperate with one another to generally vet and correct a project design to ensure its competency down to the most minor details. This is necessary in the modern world simply to avoid the number of errors and delays that take place on a construction site. Vetting and/or correcting project designs is a critical aspect of the AUTOBUILD Project Assembly System to provide precise and accurate information and direction to enable computers, robots, drones, etc. (i.e., non-human participants) to carry out a project design in an automated manner.

The AUTOBUILD Bid Project Assembly System vets at least the following: design intent; compatibility of materials and their connections to other materials; material strengths; structural integrity; moisture contents; colors; precise locations in the intended three-dimensional envelope, etc. The AUTOBUILD Project Assembly System very basically ensures the project design and information provided in support thereof are competent, compatible, and comprehensive toward the intended project design in order to accomplish the main goal of this art, which is building/assembling/constructing the project design in an automated manner. This is the main objective of this art: to properly build in automation manner. These steps are required to accomplish it.

The AUTOBUILD PROJECT ASSEMBLY system/module according to the present invention meets these objectives. During the entire operation, the AUTOBUILD PROJECT ASSEMBLY system/module is utilized to communicate the status of the project through the schedule. This system utilizes checkpoints that can be reviewed and monitored by a professional human being to ensure it is on track. Flexibility is built in to allow for adjustments and corrections that may be required or desired along the way. The AUTOBUILD PROJECT ASSEMBLY system/module is configured to accommodate what exists in today's technologies, but also anticipates how technology will improve the system over time by way of automation and robotics.

Autobuild Project Assembly System Software Module

This software module component carries out the entire assembly of a designed construction project by directing subjects that will do the actual assembly, including utilizing automation and robotics that are currently available, and is adaptable to automation and robotics as the system evolves into the future. Initially, this system/module gathers the project design data, existing conditions of the site, and basic schedule constraint goal information inputted into it. It then takes this information, separates and categorizes all parts and pieces from large pieces of equipment and assembly systems to the smallest connection materials such as closure trim, screws, nails, adhesives, etc. With this information, the system further establishes project control points to ensure precise placement of each element and creates a step-by-step, piece by piece, matrix and sequence to control and direct the placement of each element.

Once a detailed plan is put into place by the AUTOBUILD PROJECT ASSEMBLY system/module it may be reviewed by a professional human operator, and with a push of a button, the system starts commencement of the initial physical activities required to take place on the project. Once these initial activities near completion, successor activities would then be put in queue to begin. An internal check off and control notification/alarm is in communication with vendors whose activities are next in line. In fact, this communication is sent to all vendors down the line to keep them informed of where the actual progress of the project is at any time.

As this communication is given, there is further specific information sent to the vendor whether it be a human being within the profession or an automated/robotic that is actually doing the assembly in order for the assembly to be executed precisely as needed. This information shall include, but not be limited to, three-dimensional placement, adjacent attachment elements, attachment procedures and materials, any specific care instructions, quality control requirements and tolerances, etc. This information is provided in a manner that is unique in the industry. Once in use, it will become standard in the industry, for any party including automation, robotics, and mechatronics to decipher and carry out its required execution.

The AUTOBUILD PROJECT ASSEMBLY system/module also ties into the initial phase of a project called "materials and equipment procurement". This is to ensure that the required materials and equipment for the project are fabricated and delivered to the jobsite in time for the proper sequence of the assembly to take place in a smooth and non-disruptive manner. For example, during this process, the progress of fabricating a component like structural steel, that can take several weeks or months, is tracked in real-time. If ahead or behind schedule, the overall schedule can be adjusted as may be required.

A further example is illustrated by considering real-time quantities of masonry units of an exterior building as they are put into place. The system shall constantly compare what is in place to the total required quantities of that item needed to complete the project. The tracking action of this type of information may be utilized to calculate the percent complete of items and to make any schedule adjustments. During this updating process, the AUTOBUILD PROJECT ASSEMBLY system/module sends out warnings and/or alerts to the appropriate parties and parts of the system when an activity is at risk of running behind/ahead or if an activity is in fact behind/ahead in order for possible corrective action to take place.

As the assembly proceeds, the observation portion of the AUTOBUILD PROJECT ASSEMBLY system/module (eyes and ears per se) monitors and captures the progress through a variety of means such as sensors, drones, video cameras, GPS, etc. This observation data is then sorted, reviewed, and compared with the multitude of requirements of the project and the contractual commitment made by the vendor to meet the project requirements. This is one of the checks and balances portions of the system to ensure that the progress of the project meets both the quality expectations and schedule requirements.

This observation information is sent to specific parts of the AUTOBUILD PROJECT ASSEMBLY system/module that are equipped to evaluate all the requirements, namely, verifying your exact locations, verifying quality requirements, verifying and updating schedule requirements, and comparing contractual commitment and accountabilities. For instance, this observation process allows the comparison of actual real-time status of the project completion to the schedule previously projected and calculated. Another example would be that the footings for the foundation of the building are placed precisely where they are supposed to be in comparison to the property line so as to not infringe upon easements and building lines. This precise placement is also highly important to verify and protect from a huge cost of otherwise having to correct the entire building being constructed with the wrong dimensions or in the wrong place on the property.

During this observation process, if it is found that an element does not meet one or more requirements, that information is communicated back to the entire checks and balance portion of the system to alert for corrections needed. That information is also sent to the particular vendor that is not in compliance to notify the vendor to take prompt corrective action. This is another point at which a professional human being may be alerted and enter the system to make the appropriate corrections.

Absent any requirements not being met or corrective action being needed, the system continues in a revolving cycle to the check off and notify the vendors next in queue. The process repeats itself until the entire project is assembled. This system provides a recording of the entire process for purposes of historical record, legal requirements or disputes, project "As Builts", and for artificial intelligence learning as an enhancement to the system.

The reader will note that portions of the logic and operations of the system are built on a foundation of basic historic construction logic acquired from years of standard assembly sequence in the industry. Then, information/input received from vendors bidding the project, particularly from those vendors that have contractual commitments to assemble its portion of the project, is considered and evaluated both before the project assembly starts and throughout the process. It should also be noted that environmental factors, exemplified by weather conditions, are also considered.

BRIEF DESCRIPTIONS OF THE DRAWINGS

Other features and objectives of the present invention will become more evident from a consideration of the following brief description of the patent drawing submitted in support of these specifications.

FIG. 1 is a flowchart diagram depicting a centralized or hub-like Project Assembly Conversion and Management software module component in downflow communication from a series of Project Design, Basic Schedule Constraints, and Existing Conditions of Site software module components with a series of branching software module components or nodes in downflow communication from the Project Assembly Conversion and Management software module component.

DETAILED DESCRIPTION OF THE PREFERRED EMBODIMENT

A software program may comprise numerous modules as separate executable files that form parts of a whole program. A module is a software component or part of a program that contains one or more routines. One or more independently developed modules make up a program. An enterprise-level software application may contain several different modules, and each module serves unique and separate business operations. Given the complexity of the overall operating system, the author has selected the term module to describe the software module components that together cooperate to provide or support the Comprehensive Construction Project Management System of U.S. patent application Ser. No. 17/133,714 ('714 Application) from which this application claims a benefit and is a Continuation-in-Part Application.

FIG. 1 has been provided to illustrate the general internodal communication and operation of the AUTOBUILD PROJECT ASSEMBLY system/module. Referencing FIG. 1, the reader is first directed to the BG5 Project Assembly Conversion & Management Node (105). The BG5 Node (105) accumulates the information inputted into it as it relates to electronic Project Design Data (101), basic or desired Schedule Duration Constraints (102), and the Site Evaluation & Existing Conditions (103). The Project Design Data (101), desired Project Duration Constraints (102), and the Site Evaluation & Existing Conditions (103) are developed and available in the market as separate information bundles and thus separate from the AUTOBUILD PROJECT ASSEMBLY system/module according to the present invention, but are necessarily fed into the AUTOBUILD PROJECT ASSEMBLY for proper functioning.

The BG5 Node (105), with its intelligence, recognizes and extracts the specific information it needs to carry out its purpose of assembling the project in a timely manner. For instance, it deciphers information such as needed material, fabrication activities, delivery requirements, equipment, labor, three-dimensional control points, assembly constraints, etc. that is needed to develop a fully comprehensive plan for the assembly of the project. While extracting this information the BG5 Project Assembly Conversion & Management Node or software module component (105) accumulates quantities of such items; this information is then utilized downstream to assist in such things as inventory verification and percent completion to assist in the reporting of timely completion.

During this process, the information is organized in a manner that anticipates communicating direction to the instruments that will provide the actual assembly, whether it be a human beings in the profession or some automation/mechatronics format such as drones or robotics, etc. This is done with its built-in intelligence that initially considers the basic logic built with a foundation of historic construction sequence knowledge generated from years of standard assembly sequence in the industry.

As stated, the BG5 Node or software module component (105) has its own internal intelligence to start separating, categorizing, and organizing each of the elements that are to be integrated into the project. Although the BG5 Node (105) may minimally and preliminarily perform its function as derived from historic data intelligence, which preliminary performance activities can be later checked and reviewed for possible variances to the particular project. At this juncture, there is an option to help start this process with better accuracy if in fact the project has been estimated within a system that provides detailed line items of the required elements of the project along with quantities. This is most often the case when the project proceeds.

Estimates are generated as one of the very first steps in determining whether a project is viable from a cost standpoint before it has permission to proceed. There are systems today that are currently developed or being developed that are formatted in a way and can be utilized to be inputted into the BG5 Node (105) to accomplish this. In FIG. 1, the reader will consider what was just described as an optional C9 Line-Item Quantities Integration Node or software module component (109). This is where, if there is a detailed estimate created with compatible software, the predetermined elements and quantities can be inputted into the system.

Once it has processed all the incoming information, the BG5 Node (105) then delivers the information received in a manner that can be sent to downstream to the G81 Establish Project Control Points and GPS Node (181) which combines the information from the design and site evaluation in existing conditions provided from the BG5 Node (105) and develops the necessary three-dimensional controls that will be used throughout the project. This node is essential for accommodating all types of site conditions such as existing structures on the site, existing utilities, topographic elevations of the site, water flow and sheeting across the site, locations of existing curbs, paving, and other traffic rights-of-way, etc. in order to complete a proper and accurate sequence and schedule for the project. The G81 Node (181) organizes the elements of the project into its three-dimensional spot similar to putting together a puzzle. This node creates a coding system that labels each piece of the puzzle and matches it in its precise three-dimensional space of the project. It is the G81 Node (181) that allows the tracking of actual physical status on the projects site along with a few others discussed in more detail below.

The Node referenced at D22 and labeled as a Step-by-Step Piece by Piece Build Sequence and Exact Location Node (122) receives the most current desired schedule and sequence for the project from the G81 Node (181) to create a scheduled sequence system for the project that can be utilized by parties (human beings in the profession or some automation/mechatronics format such as drones or robotics, etc.) fabricating and assembling the project in real time. The D22 Node (122) establishes a three-dimensional or 3D control system within which the project is to be built and confirms that the elements of the facility are in the exact spatial location as required. This capability is mostly received from the work done by the G81 Node (181). Most importantly, this node manages and governs the sequence of work in the process since it is a node that is in the continuous cycle of the revolving commands, progressing each of the elements to be assembled throughout the complete construction assembly process.

As the D22 Node (122) manages and oversees the placement of each element within the 3D environment, it is also communicating with the scheduling portions of the system, such as the D23 Node (123) in bi-directional or two-way communication with the Node D22 (122) to confirm elements are being installed in proper sequential order as required. The D22 Node (122) further operates in conjunction with the G82 Node (182) in downflow communication therewith to maintain constant updates as to what the actual conditions are on the project site. If some aspect of the project is amiss, the G82 Node (182) sends out alerts that corrections are required. Any possible re-sequencing or schedule adjustments that may be required can be implemented at this node by a human professional overseeing the project or within the evolving automation systems, drone capabilities, robotic assemblies, etc., to re-sequence the work plan. This also produces a possible waterfall effect, depending on how big of change, that needs to be communicated with all other activities needing to take place downstream in order for those parties to make necessary adjustments in implementing their part of the work.

The D21 Node (121) is an OPTION TO INPUT OUTSIDE PRODUCED SCHEDULE node. The D21 Outside Project Schedule Input Node (121) is an optional input from a previously developed schedule and software that currently exists or is being developed that can communicate with and be inputted into the AUTOBUILD PROJECT ASSEMBLY system/module. The benefit in utilizing this input node is that a schedule for the project can be injected into the system that more accurately follows the intent of the project as it was being conceptually envisioned during a preconstruction process. This also, in a sense, provides another checks and balance by allowing a review done by a human professional or separately marketed scheduling software that can collaborate with the schedule provided by the AUTOBUILD PROJECT ASSEMBLY system/module.

In other words, it provides the most current updated comprehensive schedule in a format that can be reviewed, as a checks and balance, by a professional human being having experience and understanding of the project. The D22 Node (122) then highlights any discrepancies it finds to help these concerns be brought to the attention of the professional human being doing the review. The reviewer has the ability and the option to go well beyond what the D22 Node (122) may automatically produce. The reviewer has the ability and the option to manually adjust any sequence, activity, or duration to the schedule at that particular time of the process within the D22 Node (122). The D22 Node (122) also considers site logistics, level of difficulty of project, effects of weather from the region, etc.

The G82 Node (182) is a Work in Place Check Off System-Control, Confirmation, Notification, Alarm, and Vendor Response node or software module component. The G82 Node (182) is another important element that works closely in conjunction with the D22 Node (122) and the circular system of monitoring the actual work progress on site. The G82 Node (122) comprises all the required information and data for precisely coordinating and managing all building elements as they are assembled from the standpoint of verifying the products are (a) per specification, (b) positioned in the correct location(s), (c) assembled in the correct sequence, (d) connecting two adjacent products correctly, (e) meeting the project schedule, etc.

When the G82 Node (182) detects a product problem (i.e. when something is amiss or not meeting the contractual requirements), notification(s) and/or alert(s) are sent out to the appropriate parties to make adjustments and corrections. For serious and urgent issues that have a major impact on the project or safety to people and the environment, a more robust alarm will be triggered to better communicate a sense of urgency. The G82 Node (182) utilizes, communicates, and coordinates with other nodes that form the physical monitoring and tracking system of the actual project status or current work flow.

The G83 Node (183) is a Vendor Robot Interceptor & Robot Action node. The G83 Node (183) operates from either Professional Human Beings or within software-based components that may already be carried or implemented by vendors involved with the project, and through current and future developments of Drone and Robotic abilities. The G83 Node (183) is basically the communication system that informs and directs human laborers, drones, mechanical equipment, and robots to carry out the work required in the appropriate sequence, in the correct location, and at the correct time. The G83 Node (183) further has the capability to communicate back to appropriate nodal functions that are needed for collaboration of physical actions so that on-site work advances properly.

The G84 Node (184) is a Live Video Progress and Security Surveillance node. The G84 Node (184) coordinates live video through fixed cameras and drones and other sensors that are tied into GPS systems to track progress visually and materially in real-time at the project site. The G84 Node (184) provides the eyes, ears, and fingers to the AUTOBUILD PROJECT ASSEMBLY system/module that functions similarly to a human operator or superintendent in visualizing, inspecting, confirming, even touching and feeling elements of the project to ensure timely compliance with an ability to communication directly or indirectly with other support nodes to keep the circular system flowing toward progress. The G84 Node (184) is preferably further equipped with sensors to detect temperature, moisture, density, etc. so as to help monitor, confirm, and communicate necessary information and data to appropriate peripheral support nodes within the AUTOBUILD PROJECT ASSEMBLY system/module. This affects the proper placement, project schedule, quality control, sequence, and any other project/contractual requirements.

The G85 Node (185) is a Verification of Install Location node. The G85 Node (185) is preferably in direct downflow communication from the G84 Node (184) and in upflow communication to the F52 Node (152). The G85 Node (185) thus interacts with the G82 Node (182), the G84 Node (184) and the F52 Node (152) to confirm and coordinate all elements of the project as they are being installed in the exact location required utilizing GPS systems along with the data giving direction for the correct installation that includes the coding system that was previously discussed within the G81 Node (181). If placement is incorrect in any manner, an alert communication is sent to the F52 Node (152) and indirectly to the G82 Node (182) in order for corrective action to take place.

The G86 Node (186) is a Quality Verification node. The G86 Node (186) is basically an extension of the G84 Node (184) in downflow communication therewith and further interacts with the G83 Node (183), the G84 Node (184), and the F52 Node (152) to confirm all products being installed precisely meet the project specifications. The G86 Node (186) utilizes equipment that monitors assembly aspects such as temperature, moisture, density, connections, color, adhesives, levelness, plumbness, room are precise 3D placement location, etc. and compares this information with project requirements that have been designed and specified in the contract documents.

The F52 Node (152) is a Contractual Commitment and Accountability System node at which contract agreements are populated from vendors that are contracted with the project and, in unilateral communication with the D23 Project Schedule Update Node (123), the G82 Check-Off & Control Notification/Alarm Vendor Response Node (182), the G85 Verify Exact Location of Install Node (185), and the G86 Quality Verification Node (186). The F52 Node (152) essentially confirms, in written detail, the scope of work to be provided along with all performance criteria including quality and schedule requirements that were contractually committed to by vendors.

At this point there is incoming communication in the case of a contractual commitment not being met in order to allow members of the vendor's organization supplying materials, labor, or services to the project to be aware of something being amiss concerning the scheduled progress and allow them to take action. This may be in addition to the corrections taking place on the project site at the time. In construction contracting, it is common practice to state terms of communication that may present nonconformance to the construction contract. This communication between the D23 Node (123), the G82 Node (182), the G85 Node (185), the G86 Node (186), and the F52 Node (152) facilitates the legal obligations for notice of noncompliance or default that are typically required by contract.

The D23 Node (123) and the D24 Node (124) respectively, are essentially Project Schedule Update or Review and Adjust Schedule nodes, both of which are in downflow communication with the D22 Node (122). While the D23 Project Schedule Update Node (123) is in direct downflow communication with the D22 Node (122), the D24 Schedule Update Node (124) flows from an onsite surveillance node denoted by the G84 Node (184) otherwise denoted as a Project Video Camera Progress and Security node. The D23 Node (123) and the D24 Node (124) work in a very similar manner by constantly measuring actual build progress and comparing the actual build progress to the planned project schedule.

The reader will note, however, that the D23 Node (123) primarily functions as a preliminary update node or module upstream or in upflow communication with the F52 Node (152) described as a Contractual Commitment and Accountability System node. The F52 Contractual Commitments and Accountability System Node (152) ensures the correct updated schedule information (best at the time) is implemented and compared with the commitment stated in the contracts with the vendors. The D24 Node (124) is placed within the revolving circle of actual on-site progress as updated by the G84 Node (184), and transmits scheduling information to the system governance nodules that are constantly managing the sequence and accuracy of the work.

While the above descriptions contain much specificity, this specificity should not be construed as limitations on the scope of the invention, but rather as an exemplification of the invention. The foregoing specifications are contemplated to essentially provide a project assembly system operable within a construction project management system. The project assembly system is contemplated to preferably comprise, in combination: a series of networked computers, the series of networked computers being in communication with one another and being configured to implement a series of non-transitory, computer-implementable, software-based modular components allowing directional inter-module communication therebetween.

The series of computer-implementable, software-based modular components preferably comprise in combination: project design, basic schedule constraints, and existing conditions of site software module component(s), the project design, basic schedule constraints, and existing conditions of site software module component providing information concerning a design project to be added for enabling the project assembly system to perform its function in providing project assembly information required for the design project.

The centralized project assembly, conversion and management software module component is in downflow communication with the project design, basic schedule constraints, and existing conditions of site software module component(s), and accumulates information received from the project design, basic schedule constraints, and existing conditions of site software module components, analyzing the information, labeling the information and organizing the information in a manner for enabling and supporting peripheral software module components in networked, inter-module communication with the project assembly, conversion and management software module component to perform peripheral software module component functions.

At least one downstream software module component receives data from the centralized project assembly, conversion and management software module component and is configured to combine information from the project design, basic schedule constraints, and existing conditions of site software module component via the centralized project assembly, conversion and management software module component for developing three-dimensional controls that will be used throughout the design project.

The project assembly system may further preferably comprise a step-by-step piece-by-piece build sequence and exact location software module component in downflow communication from the at least one downstream software module component. The step-by-step piece-by-piece build sequence and exact location software module component establishes a three-dimensional system within which the design project is to be built and confirms that the elements of the design project are in the exact spatial location as required.

The project assembly system may further preferably comprise an outside project schedule input software module component. The outside schedule input software module component is in upflow communication with the step-by-step piece-by-piece build sequence and exact location software module component for providing an updated comprehensive schedule in a format that can be reviewed, as a checks and balance, by a professional human being having experience and understanding of the project.

The project assembly system may further preferably comprise at least one schedule update software module component, the at least one schedule update software component being in downflow communication from the step-by-step piece-by-piece build sequence and exact location software module component. A project schedule update software module component measures actual build progress and compares the actual build progress to a final project schedule. The project schedule update software module component is in upflow communication with or to a contractual commitment and accountability software module component. The project schedule update software module component communicates with the contractual commitment and accountability software module component for facilitating legal obligations for notice of noncompliance.

The project assembly system may further preferably comprise a basic schedule update software module component. The basic schedule update software module component also measures actual build progress and comparing the actual build progress to the final project schedule and is in unidirectional downflow communication from a live video progress and security surveillance software module component. The live video progress and security surveillance software module component continuously updates the basic schedule update software module component with actual on-site progress data.

The project assembly system may further preferably comprise a quality verification software module component. The quality verification software module component is in downflow communication from the live video progress and security surveillance software module component and in upflow communication to the contractual commitment and accountability system software module component. The quality verification software module component utilizes equipment for monitoring assembly aspects to confirm all products are being installed precisely meet project specifications.

The project assembly system may further preferably comprise a verification of install location software module component. The verification of install location software module component is in downflow communication from the live video progress and security surveillance software module component and in upflow communication to the contractual commitment and accountability system software module component. The verification of install location software module component confirms and coordinates all elements of the design project as they are being installed in the exact location required utilizing GPS systems along with the data giving direction for the correct installation originating from the establish project control points and GPS software module component.

The project assembly system may further preferably comprise a work in place check off system-control, confirmation, notification, alarm, and vendor response software module component. The work in place check off system-control, confirmation, notification, alarm, and vendor response software module component is in downflow communication from the step-by-step piece-by-piece build sequence and exact location software module component. The work in place check off system-control, confirmation, notification, alarm, and vendor response software module component precisely coordinates and manages all building elements as they are assembled from the standpoint of verifying the products are per specification, positioned in the correct location(s), assembled in the correct sequence, two adjacent products are connected correctly, the final project schedule is being met.

The project assembly system may further preferably comprise a vendor robot interceptor and robot action software module component. The vendor robot interceptor and robot action software module component is in downflow communication from the work in place check off system-control, confirmation, notification, alarm, and vendor response software module component and in upflow communication to the live video progress and security surveillance software module component. The vendor robot interceptor and robot action software module component provide a communication system for informing and directing human laborers, drones, mechanical equipment, and robots to carry out the work required in the appropriate sequence, in the correct location, and at the correct time.

Accordingly, although the project assembly system according to the present invention has been described by reference to a number of different features and aspects, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A project assembly system comprising, in combination:
a plurality of networked computers being in communication with one another and configured to implement a plurality of non-transitory, computer-implementable, software-based components allowing inter-component communication therebetween;
a project design, basic schedule constraints, and existing conditions of site software component configured to provide information concerning a project design for enabling the project assembly system to perform its function in providing project assembly information required for a construction of a project from the project design;
a centralized project assembly, conversion and management software component in communication with the project design, basic schedule constraints, and existing conditions of site software module component configured to:
 accumulate said information received from the project design, basic schedule constraints, and existing conditions of site software component;
 analyze said information for errors to properly enable and support downstream automation processes to support a complete construction of the project design in an automated manner;
 alert a user if corrections are required for ensuring said information supports the project design and the complete construction thereof;

convert said information into a standardized data format that enables peripheral software components in networked, inter-component communication with the project assembly, conversion and management software component to perform automated peripheral software component functions;

label, and organize said information in a manner for enabling and supporting peripheral software components in networked, inter-component communication with the project assembly, conversion and management software component to perform peripheral software component functions;

send said information as labeled and organized to at least one downstream software component configured to:

receive said information from the centralized project assembly, conversion and management software component; and combine said information from the project design, basic schedule constraints, and existing conditions of site software component via the centralized project assembly, conversion and management software component for developing three-dimensional controls to be used throughout the complete construction of the project design.

2. The project assembly system of claim 1 comprising a step-by-step piece-by-piece build sequence and exact location software component in communication with the at least one downstream software component, the step-by-step piece-by-piece build sequence and exact location software component being configured to establish a three-dimensional system within which the project design is to be built and confirm elements of the project design are in an exact spatial location as required.

3. The project assembly system of claim 2 comprising an outside project schedule input software component, the outside schedule input software component being in communication with the step-by-step piece-by-piece build sequence and exact location software component and configured to provide an updated comprehensive schedule in a format that can be reviewed, as a checks and balance, by a professional human being having experience and understanding of the project design.

4. The project assembly system of claim 3 comprising at least one schedule update software component in communication with the step-by-step piece-by-piece build sequence and exact location software component.

5. The project assembly system of claim 4 wherein the at least one schedule update software component comprises a project schedule update software component configured to measure actual build progress and compare the actual build progress to a final project schedule, the project schedule update software component being in communication with a contractual commitment and accountability software component, the project schedule update software component communicating with the contractual commitment and accountability software component for facilitating legal obligations and for issuing noncompliance notifications.

6. The project assembly system of claim 4 wherein the at least one schedule update software component comprises a basic schedule update software component configured to measure actual build progress and compare the actual build progress to the final project schedule and being in communication from a live video progress and security surveillance software component configured to continuously update the basic schedule update software component with actual on-site progress data.

7. The project assembly system of claim 6 comprising a quality verification software component in communication with the live video progress and security surveillance software component and in communication with the contractual commitment and accountability system software component, the quality verification software component being configured to utilize equipment for monitoring assembly aspects to confirm all products are being installed precisely to meet project design specifications.

8. The project assembly system of claim 7 comprising a verification of install location software component-in communication with the live video progress and security surveillance software component and in communication with the contractual commitment and accountability system software component, the verification of install location software component being configured to confirm and coordinate all elements of the project design as they are being installed in the exact location required utilizing GPS systems along with data giving direction for the correct installation originating from the establish project control points and GPS software component.

9. The project assembly system of claim 8 comprising a work in place check off system-control, confirmation, notification, alarm, and vendor response software component in communication with the step-by-step piece-by-piece build sequence and exact location software component, the work in place check off system-control, confirmation, notification, alarm, and vendor response software component being configured to precisely coordinate and manage all building elements as they are assembled from the standpoint of verifying the products are per specification, positioned in the correct location(s), assembled in the correct sequence, two adjacent products are connected correctly, and the final project schedule is being met.

10. The project assembly system of claim 9 comprising a vendor robot interceptor and robot action software component in communication with the work in place check off system-control, confirmation, notification, alarm, and vendor response software component and in communication with the live video progress and security surveillance software component, the vendor robot interceptor and robot action software component being configured to provide a communication system for informing and directing human laborers, drones, mechanical equipment, and robots to carry out the work required in the appropriate sequence, in the correct location, and at the correct time.

11. A project assembly system operable within a computer network environment configured to implement a series of non-transitory, computer-implementable, software-based modular components allowing inter-component communication therebetween, the project assembly system comprising, in combination:

at least one computer for implementing the plurality of non-transitory, computer-implementable, software-based components;

a project design, basic schedule constraints, and existing conditions of site software component configured to provide information concerning a project design for enabling the project assembly system to perform its function in providing project assembly information required for a construction of a project from the project design; and a centralized project assembly, conversion and management software component in communication with the project design, basic schedule constraints, and existing conditions of site software component configured to:

accumulate said information received from the project design, basic schedule constraints, and existing conditions of site software component;

analyze said information for errors to properly enable and support downstream automation processes to support a complete construction of the project design in an automated manner;

alert a user if corrections are required for ensuring said information supports the project design and the complete construction thereof;

convert said information into a standardized data format that enables peripheral software components in networked, inter-component communication with the centralized project assembly, conversion and management software component to perform automated peripheral software component functions;

label, and organize said information in a manner for enabling and supporting peripheral software components in networked, inter-component communication with the project assembly, conversion and management software component to perform peripheral software component functions;

send said information as labeled and organized to at least one downstream software component configured to:

receive said information from the centralized project assembly, conversion and management software component; and combine said information from the project design, basic schedule constraints, and existing conditions of site software component via the centralized project assembly, conversion and management software component for developing three-dimensional controls to be used throughout the complete construction of project design.

12. The project assembly system of claim 11 comprising a step-by-step piece-by-piece build sequence and exact location software component in communication with the at least one downstream software component, the step-by-step piece-by-piece build sequence and exact location software component being configured to establish a three-dimensional system within which the project design is to be built and confirm elements of the project design are in an exact spatial location as required.

13. The project assembly system of claim 12 comprising an outside project schedule input software component, the outside schedule input software component being in communication with the step-by-step piece-by-piece build sequence and exact location software component and configured to provide an updated comprehensive schedule in a format that can be reviewed, as a checks and balance, by a professional human being having experience and understanding of the project design.

14. The project assembly system of claim 13 comprising at least one schedule update software component in communication with the step-by-step piece-by-piece build sequence and exact location software component.

15. The project assembly system of claim 14 wherein the at least one schedule update software component comprises a project schedule update software component configured to measure actual build progress and compare the actual build progress to a final project schedule, the project schedule update software component being in communication with a contractual commitment and accountability software component, the project schedule update software component communicating with the contractual commitment and accountability software component for facilitating legal obligations and for issuing noncompliance notifications.

16. The project assembly system of claim 14 wherein the at least one schedule update software component comprises a basic schedule update software component configured to measure actual build progress and compare the actual build progress to the final project schedule and being in communication from a live video progress and security surveillance software component configured to continuously update the basic schedule update software component with actual on-site progress data.

17. The project assembly system of claim 16 comprising a quality verification software component in communication with the live video progress and security surveillance software component and in communication with the contractual commitment and accountability system software component, the quality verification software component being configured to utilize equipment for monitoring assembly aspects to confirm all products are being installed precisely to meet project design specifications.

18. The project assembly system of claim 17 comprising a verification of install location software component in communication with the live video progress and security surveillance software component and in communication with the contractual commitment and accountability system software component, the verification of install location software component being configured to confirm and coordinate all elements of the project design as they are being installed in the exact location required utilizing GPS systems along with data giving direction for the correct installation originating from the establish project control points and GPS software component.

19. The project assembly system of claim 18 comprising a work in place check off system-control, confirmation, notification, alarm, and vendor response software component in communication with the step-by-step piece-by-piece build sequence and exact location software component, the work in place check off system-control, confirmation, notification, alarm, and vendor response software component being configured to precisely coordinate and manage all building elements as they are assembled from the standpoint of verifying the products are per specification, positioned in the correct location(s), assembled in the correct sequence, two adjacent products are connected correctly, and the final project schedule is being met.

20. The project assembly system of claim 19 comprising a vendor robot interceptor and robot action software component in communication with the work in place check off system-control, confirmation, notification, alarm, and vendor response software component and in communication with the live video progress and security surveillance software component, the vendor robot interceptor and robot action software component being configured to provide a communication system for informing and directing human laborers, drones, mechanical equipment, and robots to carry out the work required in the appropriate sequence, in the correct location, and at the correct time.

* * * * *